(12) United States Patent
Kavil Kambrath et al.

(10) Patent No.: US 11,698,053 B2
(45) Date of Patent: Jul. 11, 2023

(54) SYSTEM AND METHOD FOR CONTROLLING A WIND TURBINE

(71) Applicant: General Electric Renovables Espana, S.L., Barcelona (ES)

(72) Inventors: Jishnu Kavil Kambrath, Kannur (IN); Veena Padmarao, Bangalore (IN); Kapil Jha, Bangalore (IN); Arvind Kumar Tiwari, Niskayuna, NY (US)

(73) Assignee: General Electric Renovables Espana, S.L., Barcelona (ES)

( * ) Notice: Subject to any disclaimer, the term of this patent is extended or adjusted under 35 U.S.C. 154(b) by 246 days.

(21) Appl. No.: 17/109,502

(22) Filed: Dec. 2, 2020

(65) Prior Publication Data

US 2022/0170444 A1    Jun. 2, 2022

(51) Int. Cl.
*F03D 7/02*       (2006.01)
*F03D 7/04*       (2006.01)

(52) U.S. Cl.
CPC ......... *F03D 7/0284* (2013.01); *F03D 7/0296* (2013.01); *F03D 7/042* (2013.01);
(Continued)

(58) Field of Classification Search
CPC ...... F03D 7/0284; F03D 7/0296; F03D 7/042; F05B 2270/1032; F05B 2270/10711; F05B 2270/337
(Continued)

(56) References Cited

U.S. PATENT DOCUMENTS 8,742,609 B2    6/2014  Helle et al.
9,667,057 B2    5/2017  Roesner et al.
(Continued)

FOREIGN PATENT DOCUMENTS

CA        2343876 A1      10/2002
CN      107017647 A        8/2017
(Continued)

OTHER PUBLICATIONS

Khan et al., Control of Bidirectional DC/DC Converter for Back to Back NPC-Based Wind Turbine System Under Grid Faults, Conference 2016 4th International Conference on Development in the in Renewable Energy Technology (ICDRET), Dhaka, Bangladesh, Jan. 2016, 4 Pages. (Abstract Only). https://www.researchgate.net/publication/299508789_Control_of_Bidirectional_DCDC_Converter_for_Back_to_Back_NPC-based_Wind_Turbine_System_under_Grid_Faults DOI: 10.1109/ICDRET.2016.7421483.
(Continued)

*Primary Examiner* — Tulsidas C Patel
*Assistant Examiner* — Thomas K Quigley
(74) *Attorney, Agent, or Firm* — Dority & Manning, P.A.

(57) ABSTRACT

A system and method are provided for controlling a wind turbine. Accordingly, a controller of the wind turbine detects a transient grid event and generates a torque command via a drive-train-damper control module. The torque command is configured to establish a default damping level of a torsional vibration resulting from the transient grid event. The controller also determines at least one oscillation parameter relating to the torsional vibration and determines a target generator torque level based thereon. The target generator torque level corresponds to an increased level of damping the torsional vibration relative to the default damping level.

17 Claims, 7 Drawing Sheets

(52) U.S. Cl.
CPC .............. *F05B 2270/1032* (2013.01); *F05B 2270/10711* (2013.01); *F05B 2270/337* (2013.01)

(58) Field of Classification Search
USPC ........................................................ 700/287
See application file for complete search history.

(56) References Cited

U.S. PATENT DOCUMENTS

| | | | |
|---|---|---|---|
| 10,113,533 B2 | 10/2018 | Menke | |
| 2005/0122083 A1* | 6/2005 | Erdman | H02P 9/04 322/20 |
| 2009/0230689 A1 | 9/2009 | Burra et al. | |
| 2010/0292852 A1* | 11/2010 | Gertmar | H02J 3/381 290/44 |
| 2011/0156388 A1* | 6/2011 | Yasugi | F03D 7/043 290/44 |
| 2011/0193345 A1* | 8/2011 | Arinaga | H02H 3/093 290/44 |
| 2011/0222320 A1 | 9/2011 | Delmerico et al. | |
| 2012/0104754 A1 | 5/2012 | Rudolf et al. | |
| 2012/0147637 A1* | 6/2012 | Petter | F03D 9/255 363/74 |
| 2013/0015658 A1 | 1/2013 | Vath et al. | |
| 2013/0249501 A1* | 9/2013 | Lu | F03D 7/0224 322/21 |
| 2015/0145251 A1 | 5/2015 | Wagoner et al. | |
| 2016/0285252 A1 | 9/2016 | Burra et al. | |

FOREIGN PATENT DOCUMENTS

| | | |
|---|---|---|
| EP | 1192702 | 4/2002 |
| EP | 2481917 A1 | 8/2012 |
| EP | 2835529 A1 | 2/2015 |
| EP | 3581791 A1 | 12/2019 |

OTHER PUBLICATIONS

Extended European Search Report for EP application No. 21209780.2, dated Apr. 26, 2022.

* cited by examiner

SYSTEM AND METHOD FOR CONTROLLING A WIND TURBINE

FIELD

The present disclosure relates in general to wind turbines, and more particularly to systems and methods for controlling wind turbines in response to a transient grid event.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy and the electrical energy may be transmitted to a converter and/or a transformer housed within the tower and subsequently deployed to a utility grid. Modern wind power generation systems typically take the form of a wind farm having multiple such wind turbine generators that are operable to supply power to a transmission system providing power to an power grid.

In order to supply power to the power grid, wind turbines generally need to conform to certain grid requirements. For example, wind turbines may be required to offer fault-ride through (e.g. low-voltage ride through) capability. This requirement may mandate that a wind turbine stay connected to the power grid during one or more transient grid events, such as a grid fault. As used herein, the terms "grid fault," "fault," or similar are intended to cover a change in the magnitude of a grid voltage for a certain time duration. For example, when a grid fault occurs, the voltage of the system can decrease by a significant portion for a short duration (e.g., typically less than 500 milliseconds). In addition, grid faults may occur for variety of reasons, including but not limited to a phase conductor being connected to a ground (i.e. a ground fault), short-circuiting between phase conductors, lightning and/or windstorms, and/or accidental transmission line grounding.

In the past, the wind turbine may have been immediately disconnected in response to the voltage reduction, but as the power production of the wind turbines has increased as a percentage of the power of the power grid, the desirability for the wind turbines to remain online and ride through the transient grid events has increased. However, the voltage reduction of the transient grid event may result in the torque of the generator being significantly reduced while the rotational speed of the rotor may remain essentially unchanged. As such, when the voltage returns to pre-fault levels, a mismatch between the torque of the generator and the inertia of the rotor may result in undesirable torsional vibrations in the drivetrain of the wind turbine. The torsional vibrations may negatively impact the lifecycle of various components of the wind turbine. For example, the torsional vibrations may exceed a release threshold of the slip coupling resulting in the operable decoupling of the rotor from the generator.

Thus, the art is continuously seeking new and improved systems and methods that address the aforementioned issues. As such, the present disclosure is directed to systems and methods for controlling a wind turbine to manage torsional vibration resulting from a transient grid event.

BRIEF DESCRIPTION

Aspects and advantages of the invention will be set forth in part in the following description, or may be obvious from the description, or may be learned through practice of the invention.

In one aspect, the present disclosure is directed to a method for controlling a wind turbine. The wind turbine may have a drivetrain which includes a rotor rotatably coupled to a generator via a slip coupling. The method may include detecting, via a controller, a first transient grid event. Additionally, the method may include generating a torque command via a drive-train-damper control module of the controller in response to the first transient grid event. The torque command may be configured to establish a default damping level of a torsional vibration resulting from the first transient grid event. Additionally, the method may include determining, via the controller, at least one oscillation parameter relating to the torsional vibration. Further, the method may include determining, via the controller, a target generator torque level in response to the determination of the oscillation parameter(s). The target generator torque level may be torque level corresponding to an increased damping level of the torsional vibration which is greater than the default damping level. Additionally, the method may include modifying the torque command with a torque modifier command generated via the controller so as to establish a torque of the generator at the target generator torque level, thereby developing the increased damping level.

In an embodiment, the first transient grid event may be a low-voltage ride through event.

In an additional embodiment, the low-voltage ride through event may be characterized by a voltage decrease which is at least 50% of a pre-transient grid event voltage and less than or equal to 70% of the pre-transient grid event voltage.

In a further embodiment, the oscillation parameter(s) may be a function of a plurality of transient event parameters. The plurality of transient event parameters may include a power level prior to the first transient grid event, a grid voltage during the first transient grid event, and a duration of the first transient grid event.

In yet a further embodiment, determining the oscillation parameter(s) may also include receiving, via the controller, data indicative of at least one of the plurality of transient event parameters. The data may also include an absence of indications corresponding to at least one additional parameter of the plurality of transient event parameters. Additionally, the method may include determining, via the controller, a presumptive value for the additional parameter(s) via an estimation of the additional parameter(s).

In an embodiment, the oscillation parameter(s) may include a peak shaft torque, a torsional vibration frequency, and/or a torsional vibration duration.

In an additional embodiment, the increased damping level may reduce the peak shaft torque, the torsional vibration frequency, and/or the torsional vibration duration.

In a further embodiment, modifying the torque command with the torque modifier command may include detecting, via the controller, an approach of the oscillation parameter(s) to an activation threshold. The approaching of the activation threshold may result in the modifying of the torque command.

In yet a further embodiment, determining the target generator torque level may include determining a nominal release threshold of the slip coupling. The method may also include establishing the target generator torque level at a magnitude which is less than the nominal release threshold of the slip coupling so as to maintain traction of the slip coupling.

In an embodiment, in response to the increased damping level, the method may include achieving a sustained shaft torque level within a deviation of a shaft torque level prior to the first grid event. The sustained shaft torque level is achieved prior to detecting a second transient grid event.

In an additional embodiment, generating the torque modifier command may include receiving, via the controller, a plurality of operating parameters of the rotor or the generator. The controller may filter the plurality of operating parameters at a plurality of drivetrain torsional frequencies to generate a filtered torsional information data set. The controller may multiply the filtered torsional information data set by at least one control gain.

In a further embodiment, the control gain(s) may include a proportional gain, an interval gain, a differential gain, and/or a combination thereof.

In another aspect, the present disclosure is directed to a system for controlling a wind turbine. The system may include a generator rotatably coupled to a rotor via a slip coupling and a controller communicatively coupled to the generator. The controller may include at least one processor configured to perform a plurality of operations. The plurality of operations may include any of the operations and/or features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
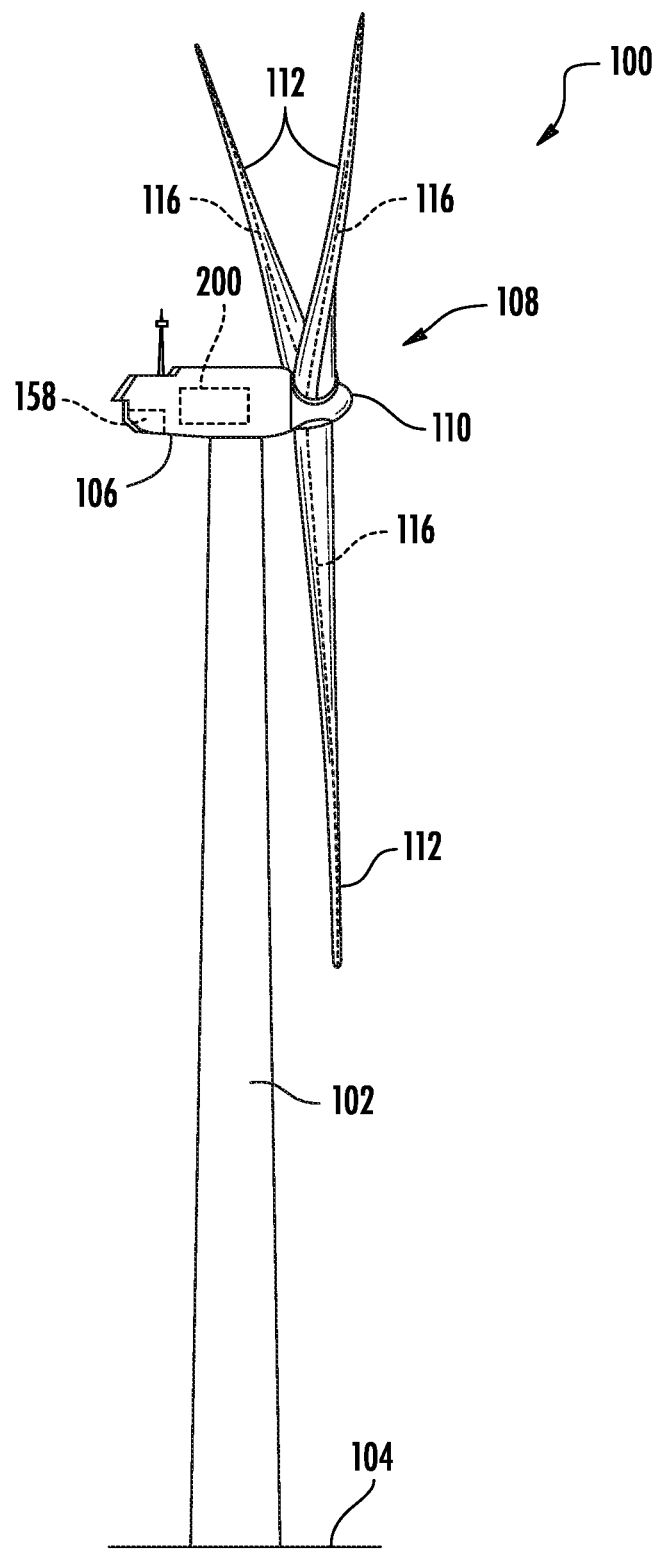
FIG. 1 illustrates a perspective view of one embodiment of a wind turbine according to the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present disclosure is directed to systems and methods for controlling a wind turbine so as to increase the effectiveness of a drive-train-damper (DTD) control system in order to rapidly damp torsional vibrations resulting from a transient grid event. Typically, wind turbines counter the torque generated by the rotor in response to the wind with a torque generated by the generator. Many modern wind turbines employ generators, such as a doubly-fed induction generator (DFIG), which utilize grid power for the generation of the generator torque. At the outset of a transient grid event, such as a low-voltage ride through (LVRT) event, the grid power may suddenly decrease resulting in a corresponding decrease in the generator torque. However, due to inertia and/or the effects of the wind, the rotor may continue rotating at the same speed and may, in some instances, accelerate when the rotation is not significantly resisted by the generator torque. When a transient grid event concludes, and the grid power returns, the generator may rapidly resume developing generator torque in order to return the wind turbine to a power producing state. However, within the drivetrain of the wind turbine, the generator torque may encounter the torque resulting from the rotation of the rotor. This encounter may develop a torsional vibration within the drivetrain. A DTD control system may be employed to rapidly damp the resultant torsional vibration. The present disclosure may increase the damping level of the torsional vibration depending on the severity of oscillations resulting from the transient grid event. Therefore, the systems and methods of the present disclosure may increase the effectiveness of the DTD control system.

In particular the present disclosure includes systems and methods which may detect a transient grid event and generate a torque command in response. The torque command may establish a default damping level of the torsional vibration developed during the recovery from the transient grid event. The severity of the torsional vibration may be indicated by at least one oscillation parameter. The oscillation parameter may be a function of the transient event parameters. For example, the transient event parameters may include the power level prior to the transient grid event, the grid voltage during the transient grid event and/or the duration of the transient grid event. Based on the relationship between the transient event parameters and the oscillation parameters, the severity of the torsional vibration may be indicated by peak shaft torque, torsional vibration frequency, and/or torsional vibration duration. If warranted by the severity of the torsional vibrations, the controller may modify the initial torque command in order to increase the damping level above the default damping level. As such, the control system may be implemented as a switchable function whose activation depends on the characteristics of the transient grid event. Additionally, the modification of the initial torque command may be informed by certain structural limitations of the wind turbine. For example, the controller may limit the torque command to a level which does not exceed a release threshold of the slip coupling of the drivetrain.

Accordingly, the present disclosure presents a novel control technique which may improve the reliability and damping capabilities of wind turbines by using existing measurements and generator speed measurements during transient grid events. As such, the damping characteristics of the wind turbine may be improved relative to a traditional drivetrain damping control system. Further, the control technique may reduce instances of coupling slippage thereby improving the reliability of the wind turbine during transient grid events. This may, in turn, serve to satisfy grid code requirements related to single and/or multiple fault ride through events. The systems and methods disclosed herein may also not require any additional measurements or additional hardware changes. In fact, if measurements are not available, estimation methods may be employed to generate the required variables. Further, it should be appreciated that the systems and methods may be employed to limit torsional vibration which may be induced by extreme wind condition such as wind gusts, resonant wind excitation, blade pass frequency excitation, and/or emergency stops.

Referring now to the drawings, FIG. 1 illustrates a perspective view of one embodiment of a wind turbine 100 according to the present disclosure. As shown, the wind turbine 100 generally includes a tower 102 extending from a support surface 104, a nacelle 106, mounted on the tower 102, and a rotor 108 coupled to the nacelle 106. The rotor 108 includes a rotatable hub 110 and at least one rotor blade 112 coupled to and extending outwardly from the hub 110. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator 118 (FIG. 2) of an electrical system 150 (FIG. 2) positioned within the nacelle 106 to permit electrical energy to be produced.

The wind turbine 100 may also include a controller 200 centralized within the nacelle 106. However, in other embodiments, the controller 200 may be located within any other component of the wind turbine 100 or at a location outside the wind turbine. Further, the controller 200 may be communicatively coupled to any number of the components of the wind turbine 100 in order to control the components. As such, the controller 200 may include a computer or other suitable processing unit. Thus, in several embodiments, the controller 200 may include suitable computer-readable instructions that, when implemented, configure the controller 200 to perform various different functions, such as receiving, transmitting and/or executing wind turbine control signals.

Figure 2:
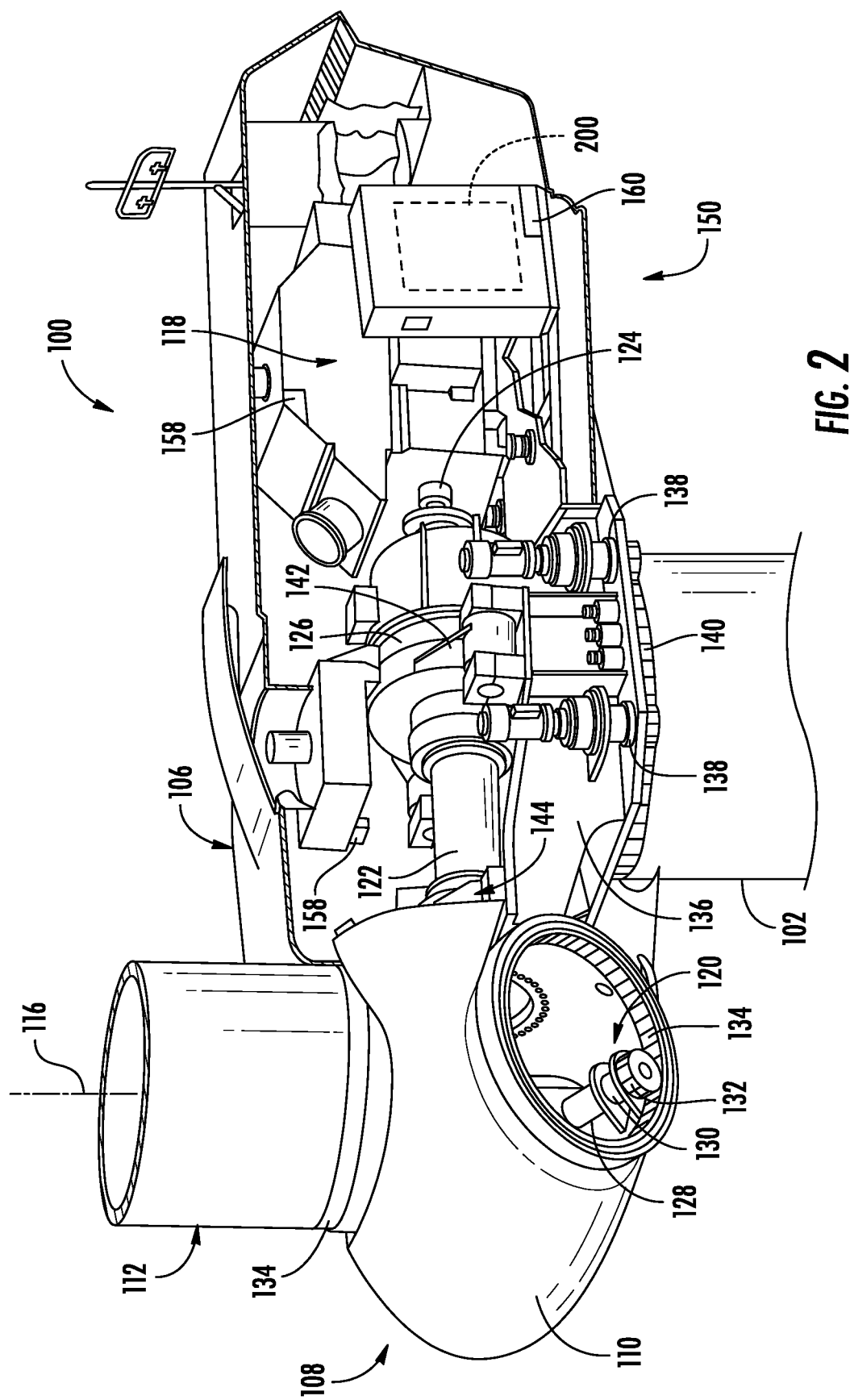
FIG. 2 illustrates a perspective, internal view of one embodiment of a nacelle of the wind turbine according to the present disclosure.
Figure 3:
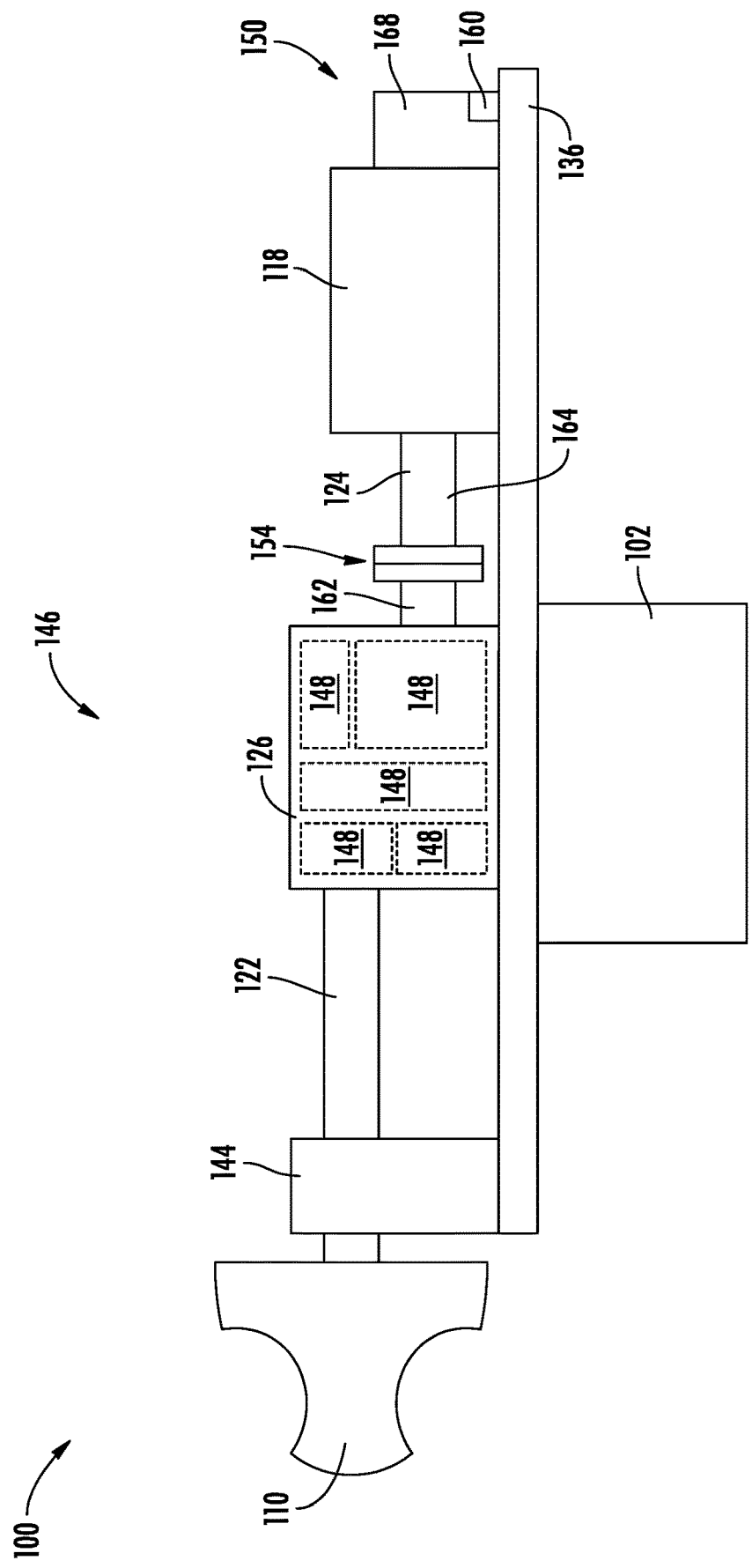
FIG. 3 illustrates a schematic diagram of one embodiment of a drivetrain of the wind turbine according to the present disclosure.
Figure 4:
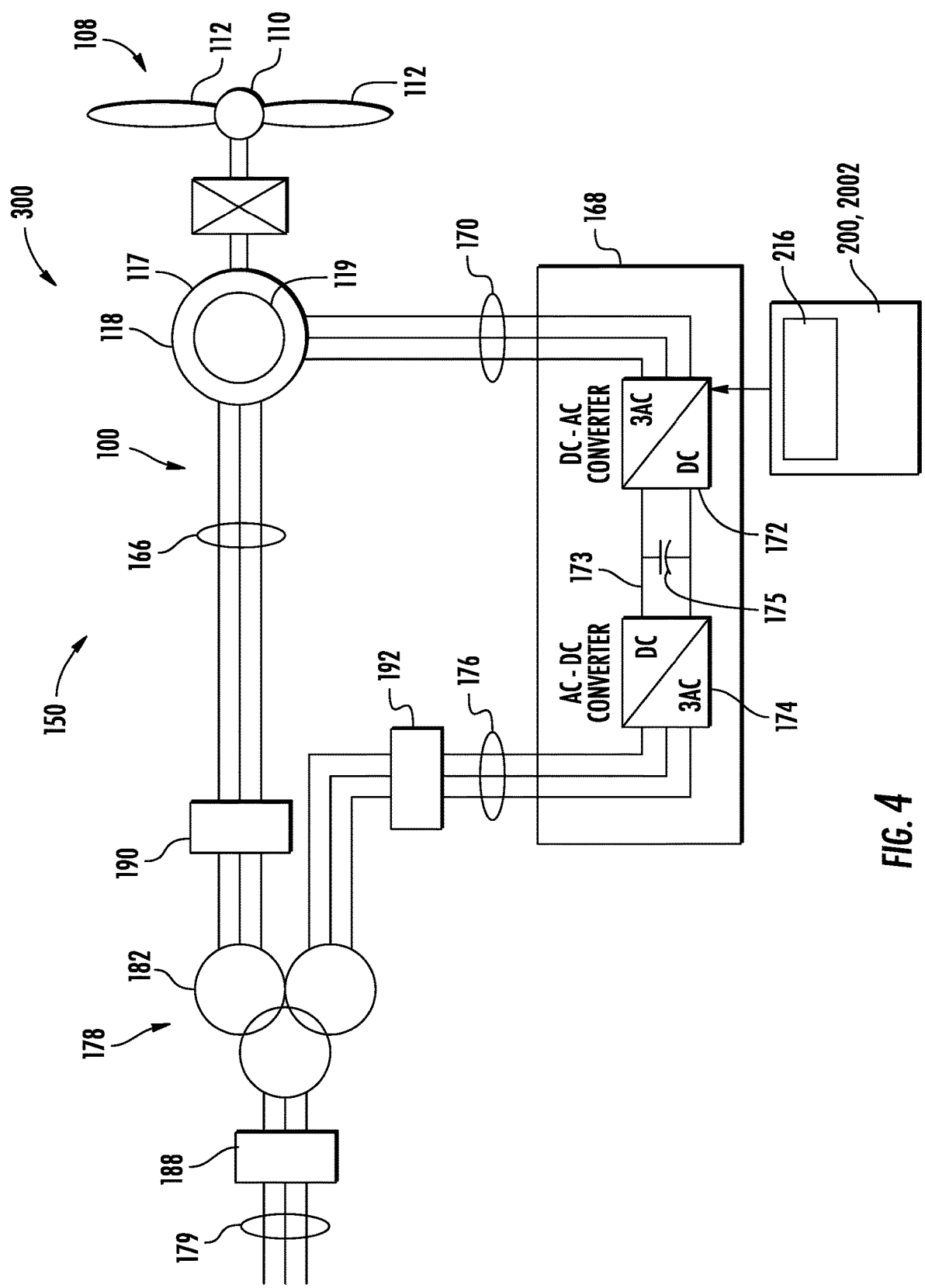
FIG. 4 illustrates a schematic diagram of one embodiment of an electrical system for use with the wind turbine according to the present disclosure.

Referring now to FIGS. 2-4, a simplified, internal view of one embodiment of the nacelle 106, a schematic diagram of one embodiment of a drivetrain 146, and an exemplary electrical system 150 of the wind turbine 100 shown in FIG. 1 are illustrated. As shown, the generator 118 may be coupled to the rotor 108 for producing electrical power from the rotational energy generated by the rotor 108. For example, as shown in the illustrated embodiment, the rotor 108 may include a rotor shaft 122 coupled to the hub 110 for rotation therewith. The rotor shaft 122 may be rotatably supported by a main bearing 144. The rotor shaft 122 may, in turn, be rotatably coupled to a high-speed shaft 124 of the generator 118 through an optional gearbox 126 connected to a bedplate support frame 136 by one or more torque arms 142. As is generally understood, the rotor shaft 122 may provide a low-speed, high-torque input to the gearbox 126 in response to rotation of the rotor blades 112 and the hub 110. The gearbox 126 may then be configured with a plurality of gears 148 to convert the low-speed, high-torque input to a high-speed, low-torque output to drive the high-speed shaft 124 and, thus, the generator 118. In an embodiment, the gearbox 126 may be configured with multiple gear ratios so as to produce varying rotational speeds of the high-speed shaft for a given low-speed input, or vice versa.

In an embodiment, the rotor 108 may be slowed via a torque generated by the generator 118. As the generator 118 may generate a torque counter to the rotation of the rotor 108, the high-speed shaft 124 may be equipped with a slip coupling 154. The slip coupling 154 may prevent damage to a component of the drivetrain 146 due to overloading of the drivetrain 146. As such, the slip coupling 154 may have a release threshold, or traction, above which the slip coupling 154 may permit first and second portions 162, 164 of the high-speed shaft 124 to have a different rotational speeds. It should be appreciated that, if the torsional moment at the slip coupling 154 exceeds the release/traction threshold, the generator 118 may be communicatively decoupled from the rotor 108. In such an event, the torque developed by the generator 118 may be unavailable to slow the rotor 108 or an increased rotational speed of the rotor 108 may be unavailable for increased power production.

Each rotor blade 112 may also include a pitch control mechanism 120 configured to rotate the rotor blade 112 about its pitch axis 116. Each pitch control mechanism 120 may include a pitch drive motor 128 (e.g., any suitable electric, hydraulic, or pneumatic motor), a pitch drive gearbox 130, and a pitch drive pinion 132. In such embodiments, the pitch drive motor 128 may be coupled to the pitch drive gearbox 130 so that the pitch drive motor 128 imparts mechanical force to the pitch drive gearbox 130. Similarly, the pitch drive gearbox 130 may be coupled to the pitch drive pinion 132 for rotation therewith. The pitch drive pinion 132 may, in turn, be in rotational engagement with a pitch bearing 134 coupled between the hub 110 and a corresponding rotor blade 112 such that rotation of the pitch drive pinion 132 causes rotation of the pitch bearing 134. Thus, in such embodiments, rotation of the pitch drive motor 128 drives the pitch drive gearbox 130 and the pitch drive pinion 132, thereby rotating the pitch bearing 134 and the rotor blade(s) 112 about the pitch axis 116. Similarly, the wind turbine 100 may include one or more yaw drive mechanisms 138 communicatively coupled to the controller 200, with each yaw drive mechanism(s) 138 being configured to change the angle of the nacelle 106 relative to the wind (e.g., by engaging a yaw bearing 140 of the wind turbine 100).

Referring particularly to FIG. 2, in an embodiment, the wind turbine 100 may include at least one operational sensor 158. The operational sensor(s) 158 may be configured to detect a performance of the wind turbine 100, e.g. in response to the environmental condition. For example, the operational sensor(s) 158 may be a rotational speed sensor operably coupled to the controller 200. The operational sensor(s) 158 may be directed at the rotor shaft 122 of the wind turbine 100 and/or the generator 118. The operational sensor(s) 158 may gather data indicative of the rotational speed and/or rotational position of the rotor shaft 122, and thus the rotor 108 in the form of a rotor speed and/or a rotor azimuth. The operational sensor(s) 158 may, in an embodiment, be an analog tachometer, a D.C. tachometer, an A.C. tachometer, a digital tachometer, a contact tachometer a non-contact tachometer, or a time and frequency tachometer. In an embodiment, the operational sensor(s) 158 may, for example, be an encoder, such as an optical encoder. In an embodiment, the operational sensor(s) 158 may be configured to monitor operating parameters 338 (FIG. 6) of wind turbine 100.

Further, in an embodiment, the wind turbine 100 may include, or be operably coupled to, at least one grid sensor 160 configured to monitor at least one parameter of the power of the power grid 179. For example, the grid sensor(s) 160 may be configured to continuously monitor the voltage of the power grid 179 as seen by the wind turbine 100. Accordingly, the grid sensor(s) 160 may, in an embodiment, be an ammeter, a voltmeter, an ohmmeter, and/or any other suitable sensor for monitoring the power of the power grid 179.

It should also be appreciated that, as used herein, the term "monitor" and variations thereof indicates that the various sensors of the wind turbine 100 may be configured to provide a direct measurement of the parameters being monitored or an indirect measurement of such parameters. Thus, the sensors described herein may, for example, be used to generate signals relating to the parameter being monitored, which can then be utilized by the controller 200 to determine a condition or response of the wind turbine 100.

Referring particularly to FIG. 4, in an embodiment, the electrical system 150 may include various components for converting the kinetic energy of the rotor 108 into an electrical output in an acceptable form to a connected power grid 179. For example, in an embodiment, the generator 118 may be a doubly-fed induction generator (DFIG) having a stator 117 and a generator rotor 119. The generator 118 may be coupled to a stator bus 166 and a power converter 168 via a rotor bus 170. In such a configuration, the stator bus 166 may provide an output multiphase power (e.g. three-phase power) from a stator of the generator 118, and the rotor bus 170 may provide an output multiphase power (e.g. three-phase power) of the generator rotor 119 of the generator 118. Additionally, the generator 118 may be coupled via the rotor bus 170 to a rotor side converter 172. The rotor side converter 172 may be coupled to a line side converter 174 which, in turn, may be coupled to a line side bus 176.

In an embodiment, the rotor side converter 172 and the line side converter 174 may be configured for normal operating mode in a three-phase, pulse width modulation (PWM) arrangement using insulated gate bipolar transistors (IGBTs) as switching devices. Other suitable switching devices may be used, such as insulated gate commuted thyristors, MOSFETs, bipolar transistors, silicone controlled rectifier's, and/or other suitable switching devices. The rotor side converter 172 and the line side converter 174 may be coupled via a DC link 173 across which may be a DC link capacitor 175.

In an embodiment, the power converter 168 may be coupled to the controller 200 configured as a converter controller 202 to control the operation of the power converter 168. For example, the converter controller 202 may send control commands to the rotor side converter 172 and the line side converter 174 to control the modulation of switching elements used in the power converter 168 to establish a desired generator torque setpoint and/or power output.

As further depicted in FIG. 4, the electrical system 150 may, in an embodiment, include a transformer 178 coupling the wind turbine 100 to a power grid 179. The transformer 178 may, in an embodiment, be a 3-winding transformer which includes a high voltage (e.g. greater than 12 KVAC) primary winding 180. The high voltage primary winding 180 may be coupled to the power grid 179. The transformer 178 may also include a medium voltage (e.g. 6 KVAC) secondary winding 182 coupled to the stator bus 166 and a low voltage (e.g. 575 VAC, 690 VAC, etc.) auxiliary winding 184 coupled to the line bus 176. It should be appreciated that the transformer 178 can be a three-winding transformer as depicted, or alternatively, may be a two-winding transformer having only a primary winding 180 and a secondary winding 182; may be a four-winding transformer having a primary winding 180, a secondary winding 182, and auxiliary winding 184, and an additional auxiliary winding; or may have any other suitable number of windings.

In an embodiment, the electrical system 150 may also include various circuit breakers, fuses, contactors, and other devices to control and/or protect the various components of the electrical system 150. For example, the electrical system 150 may, in an embodiment, include a grid circuit breaker 188, a stator bus circuit breaker 190, and/or a line bus circuit breaker 192. The circuit breaker(s) 188, 190, 192 of the electrical system 150 may connect or disconnect corresponding components of the electrical system 150 when a condition of the electrical system 150 approaches an operational threshold of the electrical system 150.

Figure 5:
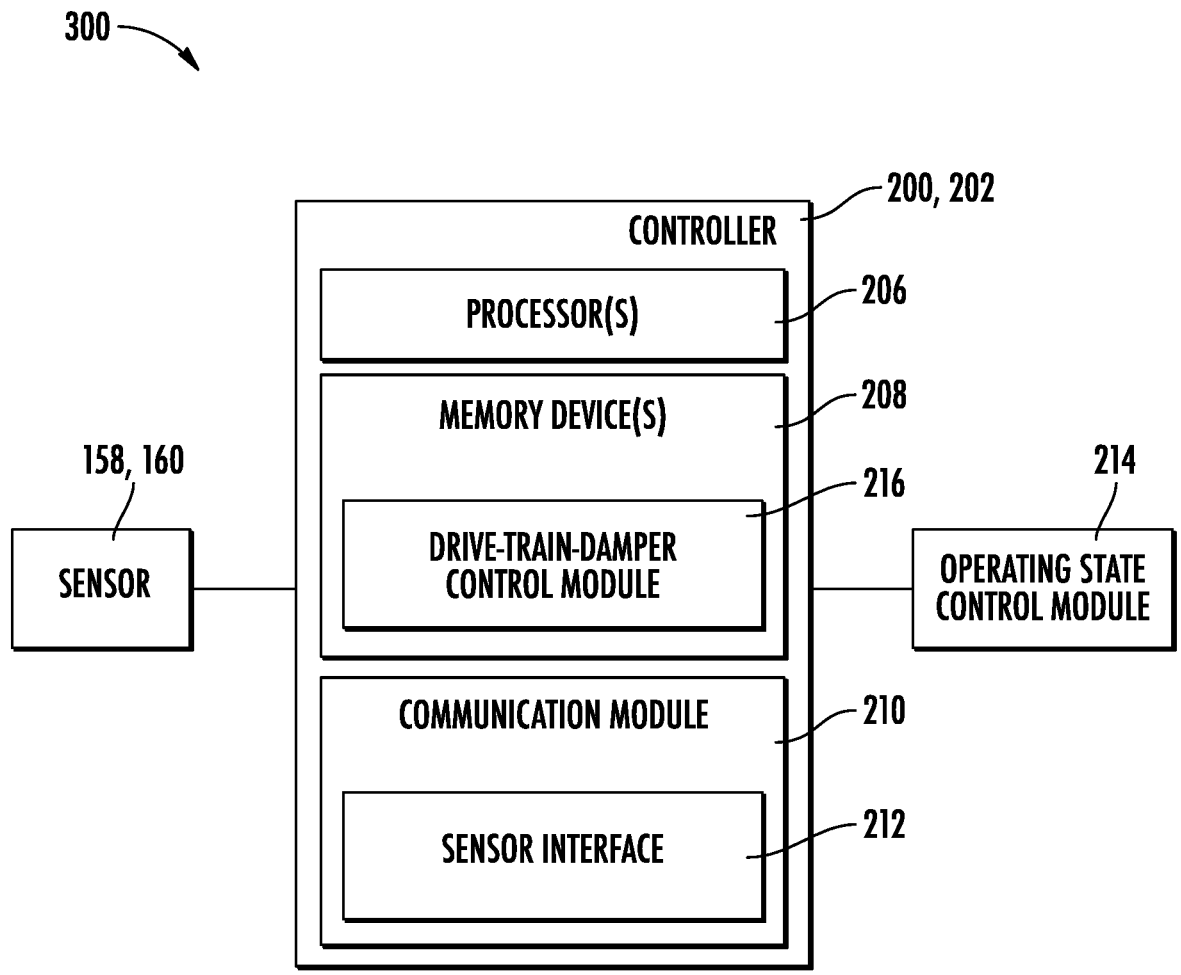
FIG. 5 illustrates a block diagram of one embodiment of a controller for use with the wind turbine according to the present disclosure.
Figure 6:
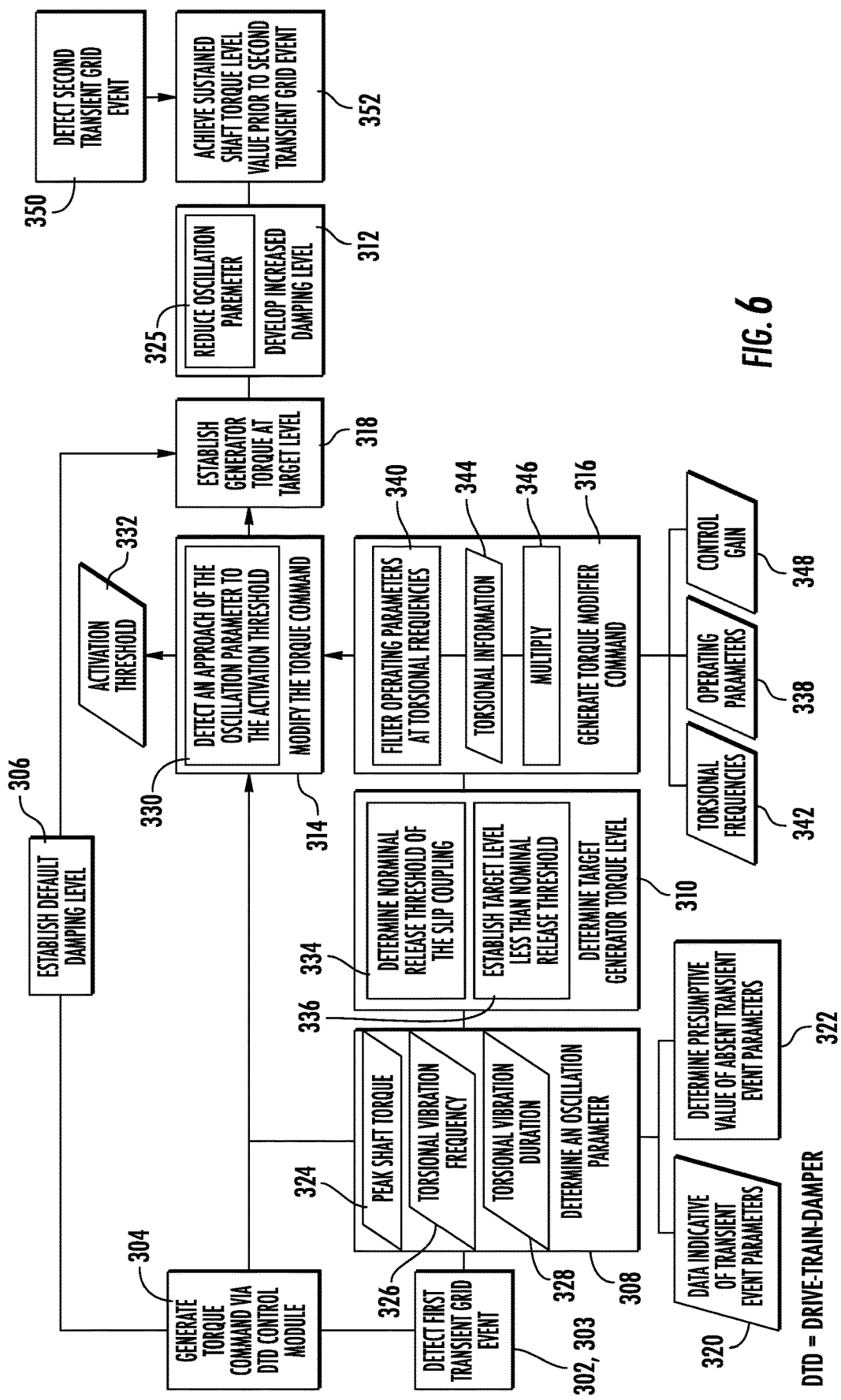
FIG. 6 illustrates a flow diagram of one embodiment of a control logic of a system for controlling a wind turbine according to the present disclosure.
Figure 7:
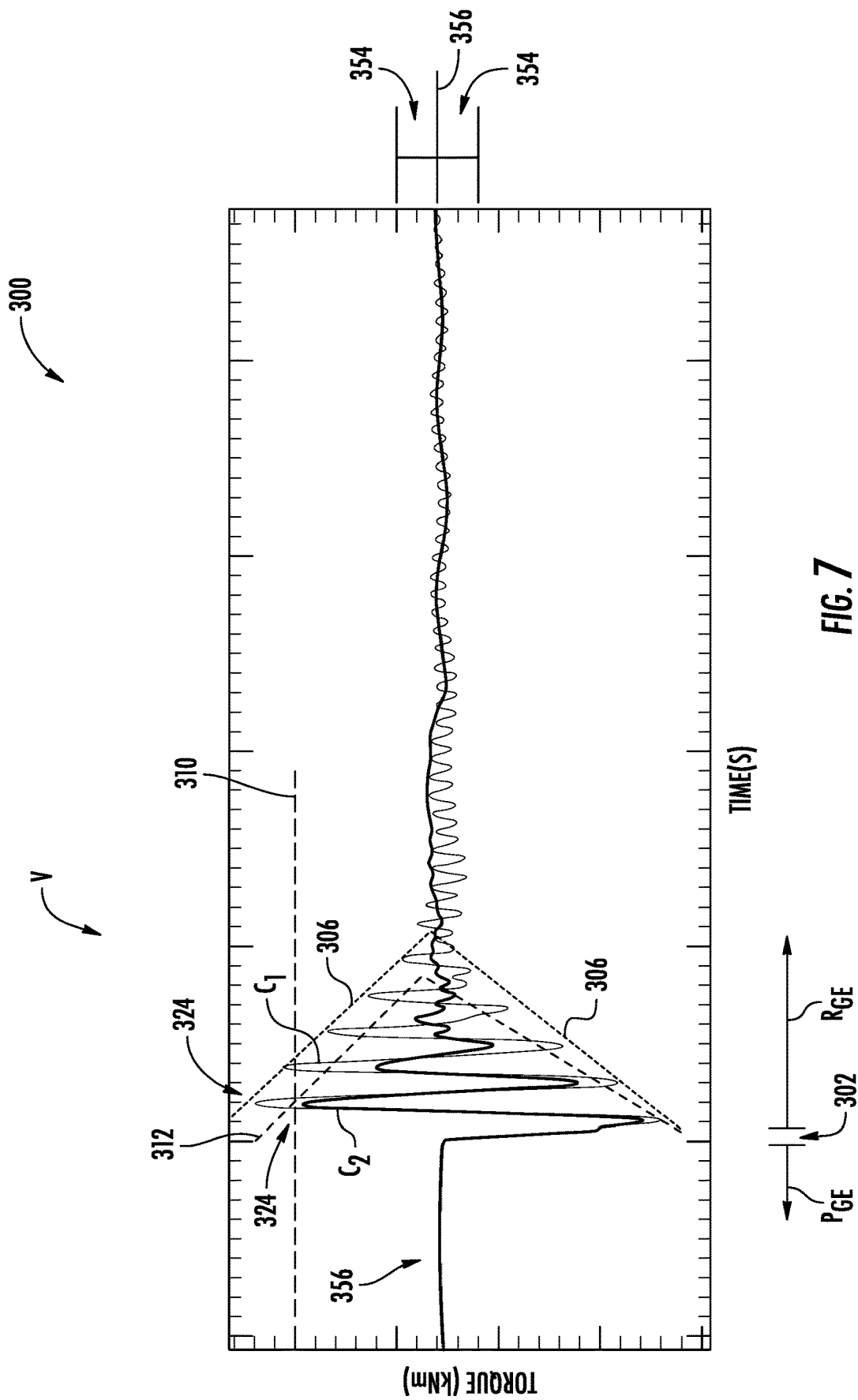
FIG. 7 illustrates a graphical representation of damped torsional vibration according to the present disclosure.

Referring still to FIG. 4 and also to FIGS. 5-7, multiple embodiments of a system 300 for controlling the wind turbine 100 according to the present disclosure are presented. As shown particularly in FIG. 5, a schematic diagram of one embodiment of suitable components that may be included within the system 300 is illustrated. For example, as shown, the system 300 may include the controller 200 communicatively coupled to the operational sensor(s) 158 and the grid sensor(s) 160. Further, as shown, the controller 200 includes one or more processor(s) 206 and associated memory device(s) 208 configured to perform a variety of computer-implemented functions (e.g., performing the methods, steps, calculations and the like and storing relevant data as disclosed herein). Additionally, the controller 200, may also include a communications module 210 to facilitate communications between the controller 200, and the various components of the wind turbine 100. Further, the communications module 210 may include a sensor interface 212 (e.g., one or more analog-to-digital converters) to permit signals transmitted from the sensor(s) 158, 160 to be converted into signals that can be understood and processed by the processors 206. It should be appreciated that the sensor(s) 158, 160 may be communicatively coupled to the communications module 210 using any suitable means. For example, the sensor(s) 158, 160 may be coupled to the sensor interface 212 via a wired connection. However, in other embodiments, the sensor(s) 158, 160 may be coupled to the sensor interface 212 via a wireless connection, such as by using any suitable wireless communications protocol known in the art. Additionally, the communications module 210 may also be operably coupled to an operating state control module 214 configured to change at least one wind turbine operating state.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 208 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 208 may generally be configured to store suitable computer-readable instructions that, when implemented by the processor(s) 206, configure the controller 200 to perform various functions including, but not limited to, detecting an detecting a transient grid event and modifying a torque command to develop an increasing damping of a torsional vibration of the wind turbine 100 as described herein, as well as various other suitable computer-implemented functions.

Referring particularly to FIGS. 6 and 7, in an embodiment, the controller 200 of the system 300 may be configured to detect a transient grid event 302, which may be a first transient grid event 303. In response to the transient grid event 302, the controller 200 may generate a torque command 304 via a drive-train-damper control module 216. The torque command 304 may establish a default damping level 306 of a torsional vibration (V) resulting from the transient grid event 302. Additionally, the controller 200 may, in an embodiment, determine at least one oscillation parameter 308 relating to the torsional vibration (V). In response to this determination, the controller 200 may, in an embodiment, determine a target generator torque level 310. The target generator torque level 310 may be a torque level corresponding to an increased damping level 312 of the torsional vibration (V) relative to the default damping level 306. As depicted at 314, the controller 200 may modify the torque command 304 with a torque modifier command 316. Modifying the torque command 304 with the torque modifier command 316 may, at 318, may facilitate the establishment of the generator 118 at the target generator torque level 310, thereby developing the increased damping level 312. It should be appreciated that the increased damping level 312 may, in an embodiment, be maintained through a transient-grid-event recovery phase ($R_{GE}$) following the transient grid event 302.

In an embodiment, the transient grid event 302 may be a low-voltage ride through (LVRT) event. The LVRT event may be characterized by a voltage decrease which is at least 50% of the pre-transient grid event ($P_{GE}$) voltage. In an additional embodiment, the voltage decrease may be less than or equal to 70% of the pre-transient grid event ($P_{GE}$) voltage. It should be appreciated that, in an embodiment, maintaining at least 30% of the pre-transient grid event ($P_{GE}$) voltage throughout the transient grid event 302 may facilitate the recovery of the wind turbine 100 from the transient grid event 302 in that the maintained voltage may provide an initial resistive force against which generator torque may be developed and increased. However, it should be further appreciated that in an additional embodiment, the LVRT event may be characterized by differing voltage-level changes as mandated by local grid codes. For example, in an embodiment, the LVRT event may be characterized by a voltage decrease which is at least 10% of the pre-transient grid event ($P_{GE}$) voltage. In an additional embodiment, the voltage decrease may be less than or equal to 80% of the pre-transient grid event ($P_{GE}$) voltage.

The transient grid event 302 may be defined in terms of a plurality of transient event parameters 320. In an embodiment, the plurality of transient event parameters 320 may, for example, indicate a severity of the transient grid event 302. The transient event parameters 320 may include a power level of the power grid 179 prior to the transient grid event 302 (e.g., the pre-transient grid event ($P_{GE}$) voltage). In an embodiment, the transient event parameters 320 may also include a grid voltage during the transient grid event 302 (e.g., the at least 30% of the pre-transient grid event ($P_{GE}$) voltage). Further, in an embodiment, the transient event parameters 320 may include a duration of the transient grid event 302.

In an embodiment wherein torsional vibration (V) results from the transient grid event 302, the severity of the torsional vibration (V) may be indicated by the oscillation parameter(s) 308. Accordingly, the oscillation parameter(s) 308 may be proportional to the plurality of transient event parameters 322 and thus, a function thereof. As such, in an embodiment, determining the oscillation parameter(s) 308 may include receiving data indicative of at least one of the plurality of transient event parameters 302. However, the received data may include an absence of indications corresponding to at least one additional parameter 322 of the plurality of transient event parameters 320. In such an embodiment, the controller 200 may determine a presumptive value for the additional parameter(s) 322 via an estimation of the additional parameter(s) 322. It should be appreciated that the utilization of an estimation method may facilitate the controller 200 in determining the oscillation parameter even in the presence of poor sensor accuracy and/or sensor failure. This, in turn, may alleviate a requirement for redundant sensor systems.

Being descriptive of the torsional vibration (V) resulting from the transient grid event 302, the oscillation parameter(s) 308 may, in an embodiment, include data indicative of a peak shaft torque 324. The peak shaft torque 324 may, in an embodiment, be the internal torque (e.g. torsion) of the of the high-speed shaft 124 developed based on a transmitted torque loads from the rotor 108 and the generator 118. The peak shaft torque 324 may, in an embodiment, be the torque level experienced by the slip coupling 154. The peak shaft torque 324 may, in an embodiment, be proportional to the pre-fault power level of the grid 179, the multiplicative inverse of the duration of the transient grid event 302, and/or the multiplicative inverse of the grid voltage remaining throughout the transient grid event 302. Accordingly, the peak shaft torque 324 of the torsional vibration (V) may be determined via an algorithm based on the transient event parameters 320. It should be appreciated that in an embodiment, the increased damping level 312 may reduce the peak shaft torque 324 as depicted at 325.

In an embodiment, the oscillation parameter(s) 308 may include data indicative of a torsional vibration frequency 326. In an additional embodiment, the oscillation parameter(s) 308 may also include data indicative of the torsional vibration duration 328. It should be appreciated that each of the torsional vibration frequency 326 and the torsional vibration duration 328 may be subject to limits imposed by the power grid 179. Therefore, as depicted at 325, in an embodiment, the increased damping level 312 may facilitate the satisfaction of the power grid requirements by reducing the torsional vibration frequency 326 and/or the torsional vibration duration 328.

The oscillation parameter(s) 308 may be graphically represented in FIG. 7 by curves $C_1$ and $C_2$. As depicted, curve $C_1$ may represent the oscillation parameter(s) 308 of the drivetrain 146 developed in response to the transient grid event 302 when subjected to the default damping level 306. In contrast, curve $C_2$ may represent the effects of the increased damping level 312 on the oscillation parameters 308. As depicted, the increased damping level 312 may, in an embodiment, reduce the peak shaft torque 324 and the duration of the transient-grid-event recovery phase ($R_{GE}$). In other words, the increased damping level 312 may facilitate a more rapid return to a steady-stay operation of the wind turbine 100 then may be achievable via the default damping level 306 of the DTD control module 216.

As depicted at 330 of FIG. 6, in an embodiment, the controller 200 of the system 300 may be configured to detect an approach of the oscillation parameter(s) 308 to an activation threshold 332. When the value of the oscillation parameter(s) 308 crosses the activation threshold 332, the torque command 304 generated by the DTD control module 216 may be modified to establish the generator torque at the target level 310. It should be appreciated that the activation threshold 332 may correspond to a value of the oscillation parameter(s) 308 which is indicative of a torsional vibration (V) of such magnitude, frequency, and/or duration that the increased damping level 312 is desirable. It should further be appreciated that in an embodiment wherein the transient grid event 302 results in a torsional vibration (V) whose oscillation parameters 308 do not cross the activation threshold 332, the default damping level 306 may be maintained throughout the transient-grid-event recovery phase ($R_{GE}$).

In order to ensure that the rotor 108 remains operably coupled to the generator 118 via the slip coupling 154 throughout the transient-grid-event recovery phase ($R_{GE}$), the controller 200 may, in an embodiment, be configured to determine a nominal release threshold 334 of the slip coupling 154. The nominal release threshold 334, or traction, may be a maximal torque value above which the slip coupling 154 may be configured to permit first and second portions 162, 164 of the high-speed shaft 124 to have a different rotational speeds, thereby communicatively decoupling the generator 118 from the rotor 108. Accordingly, as depicted at 336, in an embodiment, the controller 200 may establish the target generator torque level 310 at a magnitude which is less than the nominal release threshold 334 of the slip coupling 154. For example, in an embodiment, the target generator torque level 310 may be established at a magnitude which ensures that the peak shaft torque 324 does not exceed the nominal release threshold 334. It should be appreciated that exceeding the nominal release threshold 334 may result in an inability to develop the increased damping level 312 due to the resultant communicative decoupling of the generator 118 from the rotor 108. Therefore, setting the target generator torque level 310 at a magnitude in compliance with the nominal release threshold 334 may ensure that a maximal degree of damping may be developed given the conditions and operating state of the wind turbine 100.

In an embodiment, generating the torque modifier command 316 may include receiving data indicative of a plurality of operating parameters 338 from the operational sensor(s) 158. The plurality of operating parameters 338 may correspond to operating parameters of the rotor 108 and/or the generator 118. For example, the plurality of operating parameters 338 may be indicative of rotor speed, rotor angular displacement, rotor angular acceleration, generator speed, generator angular displacement, and/or generator angular acceleration.

As depicted at 340, in an embodiment, the controller 200 of the system 300 may be configured to filter the plurality of operating parameters 338 at a plurality of drivetrain torsional frequencies 342. The plurality of drivetrain torsional frequencies 342 may, in an embodiment, correspond to a plurality of natural frequencies of the torsional system. For example, the plurality of drivetrain torsional frequencies 342 may correspond to a fundamental frequency and corresponding harmonic frequencies of the high-speed shaft 124. The filtering of the operating parameters 338 may generate a filtered, torsional information data set 344. The filtering may, for example, be accomplished via any suitable filtering means, such as a band pass filter or a wavelet filter.

As depicted at 346, in an embodiment, the controller 200 may be configured to multiply the filtered, torsional information data set 344 by at least one control gain 348 so as to generate the torque modifier command 316. In an embodiment, the control gain(s) 348 may be a proportional gain, an integral gain, a differential gain, and/or a combination thereof.

In an embodiment, the transient grid event 302 may be followed by a second transient grid event 350. In such an embodiment, the system 300 may, as depicted at 352, achieve, via the increased damping level 312, a sustained shaft torque level which is within a deviation 354 of a pre-grid event shaft torque level 356 prior to the first transient grid event 303. It should be appreciated that achieving the sustained shaft torque level within the deviation 354 of the pre-grid event shaft torque level 356 prior to the occurrence of a second transient grid event 350 may facilitate compliance with power grid requirements. It should further be appreciated that, in an embodiment, grid regulations may necessitate the achievement of the sustained shaft torque level within the deviation 354 of the pre-grid event shaft torque level 356 within a specified period of time following the LVRT event.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1. A method for controlling a wind turbine coupled to a power grid, the wind turbine having a drivetrain comprising a rotor rotatably coupled to a generator via a slip coupling, the method comprising: detecting, via a controller, a first transient grid event; generating a torque command via a drive-train-damper control module of the controller in response to the first transient grid event, the torque command configured to establish a default damping level of a torsional vibration resulting from the first transient grid event; determining, via the controller, at least one oscillation parameter relating to the torsional vibration; determining, via the controller, a target generator torque level in response to the determination of the at least one oscillation parameter, the target generator torque level being a torque level corresponding to an increased damping level of the torsional vibration which is greater than the default damping level; and modifying the torque command with a torque modifier command generated via the controller so as to establish a torque of the generator at the target generator torque level, thereby developing the increased damping level.

Clause 2. The method of clause 1, wherein the first transient grid event comprises a low-voltage ride through event.

Clause 3. The method of any preceding clause, wherein the low-voltage ride through event is characterized by a voltage decrease which is at least 50% of a pre-transient grid event voltage and less than or equal to 70% of the pre-transient grid event voltage.

Clause 4. The method of any preceding clause, wherein the oscillation parameter is a function of a plurality of transient event parameters, the plurality of transient event parameters comprising a power level prior to the first transient grid event, a grid voltage during the first transient grid event, and a duration of the first transient grid event.

Clause 5. The method of any preceding clause, wherein determining the oscillation parameter further comprises: receiving, via the controller, data indicative of at least one of the plurality of transient event parameters, wherein the data further comprises an absence of indications corresponding to at least one additional parameter of the plurality of transient event parameters; and determining, via the controller, a presumptive value for the at least one additional parameter via an estimation of the at least one additional parameter.

Clause 6. The method of any preceding clause, wherein the oscillation parameter comprises at least one of a peak shaft torque, a torsional vibration frequency, and a torsional vibration duration.

Clause 7. The method of any preceding clause, wherein the increased damping level reduces at least one of the peak shaft torque, the torsional vibration frequency, and the torsional vibration duration.

Clause 8. The method of any preceding clause, wherein modifying the torque command with the torque modifier command further comprises: detecting, via the controller, an approach of the oscillation parameter to an activation threshold, wherein the approaching of the activation threshold results in the modifying of the torque command.

Clause 9. The method of any preceding clause, wherein determining the target generator torque level further comprises: determining a nominal release threshold of the slip coupling; and establishing the target generator torque level at a magnitude which is less than the nominal release threshold of the slip coupling so as to maintain traction of the slip coupling.

Clause 10. The method of any preceding clause, further comprising, in response to the increased damping level, achieving a sustained shaft torque level within a deviation of a shaft torque level prior to the first transient grid event, wherein the sustained shaft torque level is achieved prior to detecting a second transient grid event.

Clause 11. The method of any preceding clause, wherein generating the torque modifier command further comprises: receiving, via the controller, a plurality of operating parameters for at least one of the rotor and the generator; filtering, via the controller, the plurality of operating parameters at a plurality of drivetrain torsional frequencies to generate a filtered, torsional information data set; and multiplying, via the controller, the filtered, torsional information data set by at least one control gain.

Clause 12. The method of any preceding clause, wherein the at least one control gain comprises at least one of a proportional gain, an integral gain, a differential gain, and a combination thereof.

Clause 13. A system for controlling a wind turbine, the system comprising: a generator rotatably coupled to a rotor via a slip coupling; and a controller communicatively coupled to the generator, the controller comprising at least one processor configured to perform a plurality of operations, the plurality of operations comprising: detecting a first transient grid event, generating a torque command via a drive-train-damper control module of the controller in response to the first transient grid event, the torque command configured to establish a default damping level of a torsional vibration resulting from the first transient grid event, determining at least one oscillation parameter relating to the torsional vibration, determining a target generator torque level in response to the determination of the at least one oscillation parameter, the target generator torque level being a torque level corresponding to an increased damping level of the torsional vibration which is greater than the default damping level, and modifying the torque command with a torque modifier command generated via the controller so as to establish a torque of the generator at the target generator torque level, thereby developing the increased damping level.

Clause 14. The system of any preceding clause, wherein the first transient grid event comprises a low-voltage ride through event characterized by a voltage decrease which is at least 50% of a pre-transient grid event voltage and less than or equal to 70% of the pre-transient grid event voltage.

Clause 15. The system of any preceding clause, wherein the oscillation parameter is a function of a plurality of transient event parameters, the plurality of transient event parameters comprising a power level prior to the first grid transient event, a grid voltage during the first transient grid event, and a duration of the first transient grid event, and wherein the oscillation parameter comprises at least one of a peak shaft torque, a torsional vibration frequency, and a torsional vibration duration.

Clause 16. The system of any preceding clause, wherein the increased damping level reduces at least one of a peak shaft torque, a torsional vibration frequency, and a torsional vibration duration.

Clause 17. The system of any preceding clause, wherein modifying the torque command with the torque modifier command further comprises: detecting an approach of the oscillation parameter to an activation threshold, wherein the approaching of the activation threshold results in the modifying of the torque command.

Clause 18. The system of any preceding clause, wherein determining the target generator torque level further comprises: determining a nominal release threshold of the slip coupling; and establishing the target generator torque level at a magnitude which is less than the nominal release threshold of the slip coupling so as to maintain traction of the slip coupling.

Clause 19. The system of any preceding clause, wherein the plurality of operations further comprise achieving, in response to the increased damping level, a sustained shaft torque level within a deviation of a shaft torque level prior to the first grid transient event, wherein the sustained shaft torque level is achieved prior to detecting a second transient grid event.

Clause 20. The system of any preceding clause, wherein generating the torque modifier command further comprises: receiving a plurality of operating parameters of the rotor or the generator; filtering the plurality of operating parameters at a plurality of drivetrain torsional frequencies to generate a filtered, torsional information data set; and multiplying the filtered, torsional information data set by at least one control gain, wherein the at least one control gain comprises at least one of a proportional gain, an integral gain, a differential gain, and a combination thereof.

What is claimed is:

1. A method for controlling a wind turbine coupled to a power grid, the wind turbine having a drivetrain comprising a rotor rotatably coupled to a generator via a slip coupling, the method comprising:
   detecting, via a controller, a first transient grid event, the first transient grid event comprising a low-voltage ride through event characterized by a voltage which is at least 50% of a pre-transient grid event voltage and less than or equal to 70% of the pre-transient grid event voltage;
   generating a torque command via a drive-train-damper control module of the controller in response to the first transient grid event, the torque command configured to establish a default damping level of a torsional vibration resulting from the first transient grid event;
   determining, via the controller, at least one oscillation parameter relating to the torsional vibration;
   determining, via the controller, a target generator torque level in response to the determination of the at least one oscillation parameter, the target generator torque level being a torque level corresponding to an increased damping level of the torsional vibration which is greater than the default damping level; and
   modifying the torque command with a torque modifier command generated via the controller so as to establish a torque of the generator at the target generator torque level, thereby developing the increased damping level to prevent slippage of the slip coupling.

2. The method of claim 1, wherein the oscillation parameter is a function of a plurality of transient event parameters, the plurality of transient event parameters comprising a power level prior to the first transient grid event, a grid voltage during the first transient grid event, and a duration of the first transient grid event.

3. The method of claim 2, wherein determining the oscillation parameter further comprises:
   receiving, via the controller, data indicative of at least one of the plurality of transient event parameters, wherein the data further comprises an absence of indications corresponding to at least one additional parameter of the plurality of transient event parameters; and
   determining, via the controller, a presumptive value for the at least one additional parameter via an estimation of the at least one additional parameter.

4. The method of claim 2, wherein the oscillation parameter comprises at least one of a peak shaft torque, a torsional vibration frequency, and a torsional vibration duration.

5. The method of claim 4, wherein the increased damping level reduces at least one of the peak shaft torque, the torsional vibration frequency, and the torsional vibration duration.

6. The method of claim 1, wherein modifying the torque command with the torque modifier command further comprises:
   detecting, via the controller, an approach of the oscillation parameter to an activation threshold, wherein the approaching of the activation threshold results in the modifying of the torque command.

7. The method of claim 1, wherein determining the target generator torque level further comprises:
   determining a nominal release threshold of the slip coupling; and
   establishing the target generator torque level at a magnitude which is less than the nominal release threshold of the slip coupling so as to maintain traction of the slip coupling.

8. The method of claim 1, further comprising, in response to the increased damping level, achieving a sustained shaft torque level within a deviation of a shaft torque level prior to the first transient grid event.

9. The method of claim 1, wherein generating the torque modifier command further comprises:
   receiving, via the controller, a plurality of operating parameters for at least one of the rotor and the generator;
   filtering, via the controller, the plurality of operating parameters at a plurality of drivetrain torsional frequencies to generate a filtered, torsional information data set; and
   multiplying, via the controller, the filtered, torsional information data set by at least one control gain.

10. The method of claim 9, wherein the at least one control gain comprises at least one of a proportional gain, an integral gain, a differential gain, and a combination thereof.

11. A system for controlling a wind turbine, the system comprising:
   a generator rotatably coupled to a rotor via a slip coupling; and a controller communicatively coupled to the generator, the controller comprising at least one processor configured to perform a plurality of operations, the plurality of operations comprising:
  detecting a first transient grid event, the first transient grid event comprising a low-voltage ride through event characterized by a voltage which is at least 50% of a pre-transient grid event voltage and less than or equal to 70% of the pre-transient grid event voltage,
  generating a torque command via a drive-train-damper control module of the controller in response to the first transient grid event, the torque command configured to establish a default damping level of a torsional vibration resulting from the first transient grid event,
  determining at least one oscillation parameter relating to the torsional vibration,
  determining a target generator torque level in response to the determination of the at least one oscillation parameter, the target generator torque level being a torque level corresponding to an increased damping level of the torsional vibration which is greater than the default damping level, and
  modifying the torque command with a torque modifier command generated via the controller so as to establish a torque of the generator at the target generator torque level, thereby developing the increased damping level to prevent slippage of the slip coupling.

12. The system of claim 11, wherein the oscillation parameter is a function of a plurality of transient event parameters, the plurality of transient event parameters comprising a power level prior to the first grid transient event, a grid voltage during the first transient grid event, and a duration of the first transient grid event, and wherein the oscillation parameter comprises at least one of a peak shaft torque, a torsional vibration frequency, and a torsional vibration duration.

13. The system of claim 12, wherein the increased damping level reduces at least one of a peak shaft torque, a torsional vibration frequency, and a torsional vibration duration.

14. The system of claim 11, wherein modifying the torque command with the torque modifier command further comprises:
  detecting an approach of the oscillation parameter to an activation threshold, wherein the approaching of the activation threshold results in the modifying of the torque command.

15. The system of claim 11, wherein determining the target generator torque level further comprises:
  determining a nominal release threshold of the slip coupling; and
  establishing the target generator torque level at a magnitude which is less than the nominal release threshold of the slip coupling so as to maintain traction of the slip coupling.

16. The system of claim 11, wherein the plurality of operations further comprise achieving, in response to the increased damping level, a sustained shaft torque level within a deviation of a shaft torque level prior to the first grid transient event.

17. The system of claim 11, wherein generating the torque modifier command further comprises:
  receiving a plurality of operating parameters of the rotor or the generator;
  filtering the plurality of operating parameters at a plurality of drivetrain torsional frequencies to generate a filtered, torsional information data set; and
  multiplying the filtered, torsional information data set by at least one control gain, wherein the at least one control gain comprises at least one of a proportional gain, an integral gain, a differential gain, and a combination thereof.

* * * * *